United States Patent [19]

Berger et al.

[11] Patent Number: 4,681,928
[45] Date of Patent: Jul. 21, 1987

[54] POLY(AMIDE-AMIDE ACID), POLYAMIDE ACID, POLY(ESTERAMIDE ACID), POLY(AMIDE-IMIDE), POLYIMIDE, POLY(ESTERIMIDE) FROM POLY ARYLENE DIAMINE

[75] Inventors: Abe Berger, Summit; Rohitkumar H. Vora, Rahway, both of N.J.

[73] Assignee: M&T Chemicals Inc., Woodbridge, N.J.

[21] Appl. No.: 616,329

[22] Filed: Jun. 1, 1984

[51] Int. Cl.$^4$ .............................................. C08G 73/10
[52] U.S. Cl. ..................................... 528/353; 525/474; 528/26; 528/38; 528/125; 528/126; 528/128; 528/172; 528/185; 528/188; 528/288; 528/289; 528/350; 528/352
[58] Field of Search ............... 528/125, 126, 128, 172, 528/185, 188, 289, 352, 353, 350, 38, 26, 288; 525/474

[56] References Cited

U.S. PATENT DOCUMENTS

| | | | |
|---|---|---|---|
| 4,060,515 | 11/1977 | D'Alelio | 528/353 |
| 4,111,906 | 9/1978 | Jones et al. | 528/353 |
| 4,161,492 | 7/1979 | Weissel | 528/353 |
| 4,278,786 | 7/1981 | Nanaumi et al. | 528/185 |
| 4,405,770 | 9/1983 | Schoenberg et al. | 528/353 |
| 4,413,117 | 11/1983 | Reiter et al. | 528/353 |
| 4,444,979 | 4/1984 | St. Clair et al. | 528/185 |
| 4,477,648 | 10/1984 | Jones et al. | 528/185 |
| 4,485,140 | 11/1984 | Gannett et al. | 528/353 |
| 4,535,101 | 8/1985 | Lee et al. | 528/353 |

Primary Examiner—Harold D. Anderson
Attorney, Agent, or Firm—S. H. Parker; J. Matalon; R. E. Bright

[57] ABSTRACT

Aromatic or aliphatic dianhydrides and/or acid anhydrides are reacted with certain aromatic diamines alone or in combination with other diamines to produce polyimides, polyamide acids, poly(amide-imides), poly(amide-amide acids), poly(esterimides) or poly(esteramide acids). These polymers are thermoplastic in nature and have improved processing characteristics and thermal stability. The polymers may be prepared by either melt or solution polymerization techniques.

11 Claims, No Drawings

POLY(AMIDE-AMIDE ACID), POLYAMIDE ACID, POLY(ESTERAMIDE ACID), POLY(AMIDE-IMIDE), POLYIMIDE, POLY(ESTERIMIDE) FROM POLY ARYLENE DIAMINE

This invention relates to poly(amide-imide), poly(amide-amide acid), polyamide acid, Poly(esterimide and poly(esteramide acid), polyimide compositions and more particularly, to thermally stable aromatic polyimide compositions which are thermoplastic and to the method of preparing the same.

BACKGROUND OF THE INVENTION

Many attempts have been made to modify the properties of polyimides or polyimide-containing compositions by incorporating various aromatic moieties in their molecular structure to provide improved processing characteristics and thermal stability. These polymers, however, have generally not been completely satisfactory in that they do not readily lend themselves to preparation or processing by hot melt procedures, are deficient in thermal stability or may lack other useful characteristics such as good adhesion or solvent resistance.

The preparation of polyimides which are stable at high temperatures is known. Thermally stable polyimides have been prepared by reacting various aromatic tetracarboxylic acids or their derivatives, such as dianhydrides, with aromatic diprimary amines to form polyamide-acids which are soluble in dipolar aprotic organic solvents. The polyamide-acids are then cyclized either by heat treatment or by chemical means to form the polyimides. Such polyimides, however, generally are intractable and infusible as well as being insoluble in most solvents making them difficult, if not impossible, to fabricate into molded parts. Moreover, when a polyamide-acid prepolymer solution is prepared and then heat cured in situ to the polyimide, the temperature required may be too high for the substrate coated and appreciable amounts of water are uncontrollably released in addition to evaporation of the solvent. This raises other limitations as to the type of uses for such materials.

In recent years, various aromatic and heterocyclic materials have been investigated in attempts to obtain thermally stable polyimides that could be more readily prepared and fabricated. It is disclosed, for example, in U.S. Pat. Nos. 3,699,075 and 3,812,159 to Lubowitz, U.S. Pat. No. 3,847,867 to Heath et al and U.S. Pat. No. 3,879,428 to Heath that aromatic diether polycarboxylic acids and anhydrides thereof could be reacted with aromatic diamines to prepare thermally stable, high molecular weight polyimides which are soluble in organic solvents and fusible. Such polyimides are suggested as being suitable for use in preparing coatings, adhesives, films and the like or for fabrication into useful parts by conventional molding equipment. However, known polyimides prepared in this manner appear to exhibit certain deficiencies such as low Tg, inadequate adhesion to many substrates, and generally poor solvent resistance.

It has also been suggested, for example, in U.S. Pat. Nos. 4,017,459; 4,064,289; 4,239,880; and 4,405,770 that aromatic diether diamines can be reacted with tetracarboxylic acid and its derivative to prepare soluble poly(amide-imides) or polyimides which may also be melt processable. Further, in U.S. Pat. No. 3,563,951 it is suggested that thermally stable polyimides which are fusible and soluble can be prepared by reacting high molecular weight diamine capped aromatic polyether oligomers with non-diether containing aromatic tetracarboxylic acid or an anhydride derivative thereof. The uncertainty of being able to prepare soluble and melt processable polyimide and poly(amide-imide) polymers from such aromatic diamines is shown by other researchers where, for example, in a paper by George L. Brode et al., published in Journal of Polymer Science, Vol. 12, pp. 575–587 (1974) it is reported that polymers prepared with aromatic diether diamines containing a sulfonyl linkage were more melt processable than polymers having a propane linkage and in a paper published in Makomolecular Science, Vol. 1, pp. 667–670 (1980) it is reported that the reaction of 2, 2-bis[4-(p-aminophenoxy)phenyl]propane with pyromellitic dianhydride and 4,4'-carbonyldi(phthalic anhydride) resulted in the preparation of insoluble polyimides.

DESCRIPTION OF THE INVENTION

In accordance with the present invention there is provided a polyimide, a polyamide acid, a poly(amide-imide) or a poly(amide-amide acid), a poly(esterimide) or a poly(esteramide acid) composition which contains at least about 10 mole percent of the reaction product of an aromatic or aliphatic dianhydride or acid anhydride and an aromatic diamine having the formula (a)

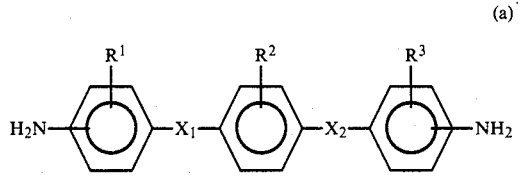

wherein
$R^1$, $R^2$ and $R^3$ each independently is hydrogen, halogen or unsubstituted or substituted hydrocarbyl;

$X_1$ and $X_2$ each independently is substituted or unsubstituted branched linear or cyclic alkylene or alkenylene of 1 to about 30 carbon atoms, —S— or —O—, with the proviso that $X_1$ and $X_2$ may not both concurrently be —S— or —O—. Preferably $X_1$ and $X_2$ each is a divalent group of the formula

wherein
$R^4$ is hydrogen, substituted or unsubstituted alkyl having up to about 12 carbon atoms, substituted or unsubstituted alkenyl having 2 to about 12 carbon atoms, substituted or unsubstituted cycloalkyl of 4 to 12 carbon atoms, substituted or unsubstituted carbocyclic aromatic or heterocyclic aromatic having 5 to about 24 carbon atoms or have mixtures thereof with the proviso that $X_1$ and $X_2$ may not both concurrently have both $R^4$ and $R^5$ as hydrogen;

n, n' and n" each independently is an integer of 1 to 4;

$R^4$ and $R^5$ each independently can be unsubstituted or substituted. When substituted, such substituents can be Br, Cl, I, F, alkoxy of 1 to 8 carbon atoms, alkyl of 1 to 8 carbon atoms.

In a preferred embodiment, R⁴ and R⁵ each independently is substituted or unsubstituted alkyl of 1 to 8 carbon atoms, substituted alkenyl of 2 to 8 carbon atoms, substituted or unsubstituted cycloalkyl of 4 to 8 carbon atoms or mixtures thereof.

Exemplary of suitable diamino compounds of formula (a) are

α,α'-(4,4'-diamino-diphenyl)-p-diisopropyl benzene;
3-(m-aminophenylthio) -(p-aminophenyl)cumene;
4-(p-aminophenoxy) -p-aminophenyl)cumene;
α,α'-(4,4'-di-N-methylamino-diphenyl)-p-diisopropyl benzene;
α,α'-(4,4'-diamino-diphenyl)-p-disecbutyl benzene;
α,α'-(4,4'-diamino-diphenyl)-m-diisopropyl benzene;
α,α'-bis (2-amino-5-methylphenyl)-p-diisopropyl benzene.
α,α'-(4,4'-diamino-diphenyl)-p-diisopropyl benzene The dianhydrides and acid anhydrides useful for reaction with the aromatic diamines of formula (a) described hereinabove may be represented by the formulae

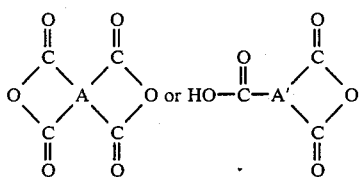

wherein A and A' are tetravalent and trivalent radicals derived from substituted or unsubstituted aromatic or aliphatic dianhydrides (for A) or acid anhydrides (for A'). Thus, A can be a substituted or unsubstituted tetravalent group of formula

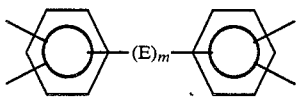

where m is 0 or 1 and E is

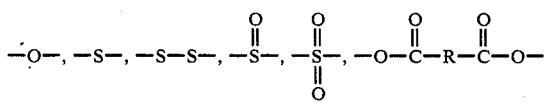

where R is a substituted or unsubstituted, linear or branched, alkylene or arylene of 1 to 30 carbon atoms,

substituted or unsubstituted linear, branched or cyclic alkylene of 1 to about 30 carbon atoms, or alkenylene of 2 to about 30 carbon atoms.

Alternatively, A may be, for example, a substituted or unsubstituted benzene or naphthalene nucleus, an aliphatic radical such as cyclopentane, cyclohexane, butane or the like.

Substituents on A may be one or more groups that do not interfere with the use of such dianhydrides in preparing the polymers of the invention.

Exemplary of radicals included in A are

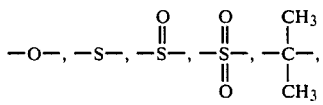

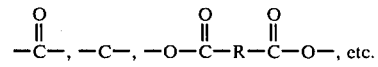

Specific dianhydrides are, for example:
3,3',4,4'-benzophenone tetracarboxylic dianhydride,
2,2',3,3'-benzophenone tetracarboxylic dianhydride,
3,3',4,4'-diphenyl tetracarboxylic dianhydride,
2,2',3,3'-diphenyl tetracarboxylic dianhydride,
2,2-bis-(3,4-dicarboxyphenyl)propane dianhydride,
2,2-bis-(2,3-dicarboxyphenyl)propane dianhydride,
2,2'-bis(trimellitic oxyphenyl)propane dianhydride
bis-(3,4-dicarboxyphenyl)ether dianhydride,
bis-(3,4-dicarboxyphenyl)sulfone dianhydride,
bis-(3,4-dicarboxyphenyl)sulfide dianhydride,
1,1-bis-(2,3-dicarboxyphenyl)ethane dianhydride,
1,1-bis-(3,4-dicarboxyphenyl)ethane dianhydride,
bis-(2,3-dicarboxyphenyl)methane dianhydride,
bis-(3,4-dicarboxyphenyl)methane dianhydride,
2,3,6,7-naphthalene tetracarboxylic dianhydride,
1,2,4,5-naphthalene tetracarboxylic dianhydride,
1,2,5,6-naphthalene tetracarboxylic dianhydride,
benzene-1,2,4,5-tetracarboxylic dianhydride,
benzene-1,2,3,4-tetracarboxylic dianhydride,
perylene-3,4,9,10-tetracarboxylic dianhydride,
pyrazine-2,3,5,6-tetracarboxylic dianhydride,
thiophene-2,3,4,5-tetracarboxylic dianhydride,
naphthalene-1,4,5,8-tetracarboxylic dianhydride,
decahydronaphthalene-1,4,5,8-tetracarboxylic dianhydride,
4,8-dimethyl-1,2,3,5,6,7-hexahydronaphthalene-1,2,5,6-tetracarboxylic dianhydride,
2,6-dichloronaphthalene-1,4,5,8-tetracarboxylic dianhydride,
2,7-dichloronaphthalene-1,4,5,8-tetracarboxylic dianhydride,
2,3,6,7-tetrachloronaphthalene-1,4,5,8-tetracarboxylic dianhydride,
phenanthrene-1,8,9,10-tetracarboxylic dianhydride,
cyclopentane-1,2,3,4-tetracarboxylic dianhydride,
pyrrolidine-2,3,4,5-tetracarboxylic dianhydride,
pyrazine-2,3,5,6-tetracarboxylic dianhydride,
1,2,3,4-butane tetracarboxylic dianhydride,
3,4,3',4'-benzophenone tetracarboxylic dianhydride,
azobenzene tetracarboxylic dianhydride,
2,3,4,5-tetrahydrofurane dianhydride,
p-phenylene-bis-(trimellitate) anhydride,
1,2-ethylene-bis-(trimellitate)anhydride,
2,2-propane-bis-(p-phenylene trimellitate) anhydride,
4,4'-[p-phenylene-bis-(phenylimino)carbonyl diphthalic]anhydride,
4,4'-diphenylmethane-bis-(trimellitamide) anhydride and mixtures thereof.

A can also be the tetravalent residue of formula

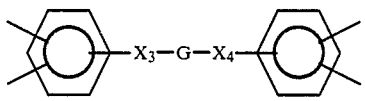

where G is phenylene or a substituted or unsubstituted group of formula

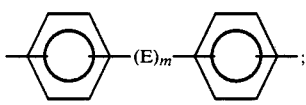

$X_3$ and $X_4$ each independently is

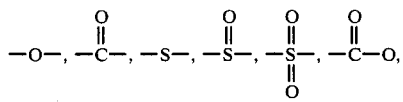

substituted linear or branched alkylene of 1 to about 30 carbon atoms, such as

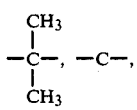

or alkenylene of 2 to about 30 carbon atoms.

Exemplary of the radicals which $X_3$ and $X_4$ may independently be are

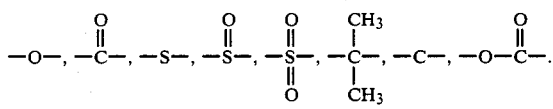

Similarly, and by analogy, the ether linkage can be replaced by —COO— to provide useful dianhydrides.

Because of relative availability, some of the preferred species of aromatic dianhydrides are:
benzophenone tetracarboxylic acid dianhydride,
diphenyl tetracarboxylic acid dianhydride,
bis(3,4-dicarboxyphenyl)sulfone dianhydride,
2,2'-bis(trimellitic oxyphenyl)propane dianhydride
2,2-bis(3,4-dicarboxyphenyl)propane dianhydride,
2,2-bis[4,4'-di(3,4-dicarboxyphenoxy)phenyl]propane dianhydride,
p-bis(3,4-dicarboxyphenoxy)phenyl dianhydride,
4,4'-bis(3,4-dicarboxyphenoxy)biphenyl dianhydride,
bis-[4,4'-di(3,4-dicarboxyphenoxy)phenyl]sulfone dianhydride,
bis[4,4'-di(3,4-dicarboxyphenoxy)phenyl]sulfide dianhydride.

Poly(amide-imides) and poly(amide-amide acids) are the reaction products of diamines with acid anhydrides. Polymers of this invention are prepared from an amine component which is the aromatic diamine of formula (a) herein described. The acid anhydride component employed to prepare such polymers can be represented by the formula:

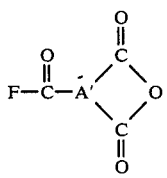

wherein A' is as described hereinabove and F is a functional group and can be —OH, chlorine, bromine, iodine, fluorine, —O—($C_1$-$C_8$) alkyl, -CN, -NCO, -NCS, SH, substituted or unsubstitute group and the like.

Exemplary acid anhydrides and derivatives thereof applicable for use in preparing poly(amide-imides) or poly(amide-amide acids) of this invention include such compounds as:
trimellitic anhydride monoacid chloride,
trimellitic anhydride,
2,6,7-naphthalene tricarboxylic anhydride,
3,3',4-diphenyl tricarboxylic anhydride,
3,3',4-benzophenone tricarboxylic anhydride,
1,3,4-cyclopentane tetracarboxylic anhydride,
2,2',3-diphenyl tricarboxylic anhydride,
diphenyl sulfone-3,3',4-tricarboxylic anhydride,
diphenyl isopropylidene-3,3 ', 4-tricarboxylic anhydride,
3,4,10-propylene tricarboxylic anhydride,
3,4-dicarboxyphenyl-3-carboxyphenylether anhydride,
ethylene tricarboxylic anhydride, etc.

There can also be used the acid anhydride analogues of the diether containing anhydrides described above in connection with the polyimides.

It has been discovered that polymers such as polyimides, poly(amide-imides) or poly(esterimides) which contain the reaction product of aromatic or aliphatic dianhydrides or acid anhydrides and aromatic diamines of formula (a) herein described or mixtures thereof with other diamines display properties that are totally surprising and unexpected. The polyimides or poly(amide-imides) of this invention are thermoplastic or hot melt processible and are generally soluble in many chlorinated hydrocarbon, dipolar aprotic, alkyl capped polyethylene glycol (alkyl capped glymes) solvents and mixtures thereof and mixtures of such solvents with various hydrocarbon. These polymers also display tenacious adhesion to a variety of organic and inorganic substrates and exhibit excellent thermal stability and, thus, can be employed as adhesives, coatings, films, fibers, etc. The polyamide acids, poly(amide-amide acids) and poly(esteramide acids) of the invention are readily suitable for conversion to thermoplastic and soluble polyimides, poly(amide-imides) or poly(esteramides) by heat or chemical cyclization means.

Also provided in accordance with the present invention is a method of preparing soluble and melt processible polyimides, poly(amide-imides) or poly(esterimides) and polyamide acids, poly(amide-amide acids) which are readily suitable for conversion to soluble and melt processible polyimides, poly(amide-imides) or poly(esterimides) which comprises reacting a dianhydride and/or acid anhydride of the type described above with an aromatic diamine having the formula (a) described above for the time necessary to prepare the desired polymer.

It has been discovered that when the particular aromatic diamines herein described or a combination thereof with other diamines are reacted with the dianhydrides and/or acid anhydrides in accordance with the practice of the invention there are unexpectedly prepared polyimides, polyamide acids, poly(amide-imides), poly(amide-amide acids), poly(esterimides) or poly(esteramide acids) which are both melt processible and soluble. Further, the polymers can generally be prepared using melt polymerization as well as solution polymerization techniques.

The polyimides, polyamide-acids, poly(amide-imides), poly(amide-amide acids), poly(esterimides) and poly(esteramide acids) of this invention are polymers which contain at least about 10 mole percent of the reaction product of an aromatic or aliphatic dianhydride or acid anhydride or mixtures thereof with an aromatic diamine having the formula (a) described above.

It has been found that polymers which contain at least about 10 mole percent of the residue having the formulae

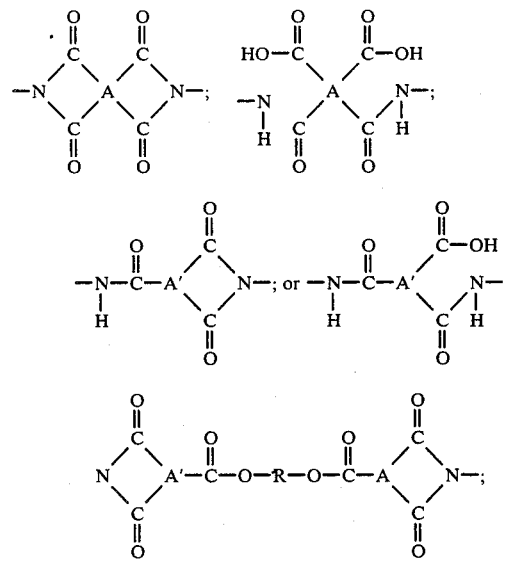

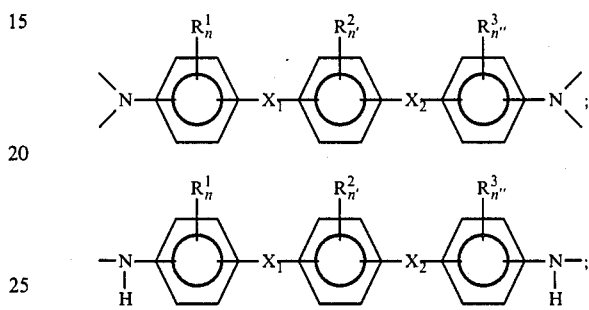

or mixtures thereof, have improved properties if said polymers also contain at least about 10 mole percent of a residue of the formulae

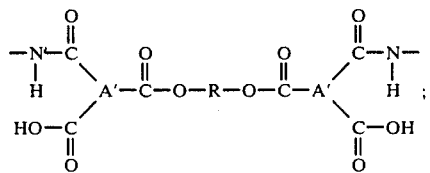

or mixtures thereof.

Polymers of this invention are generally composed of recurring units having the formulae

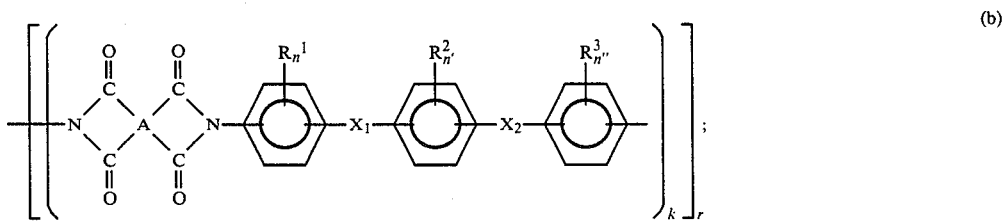
(b)

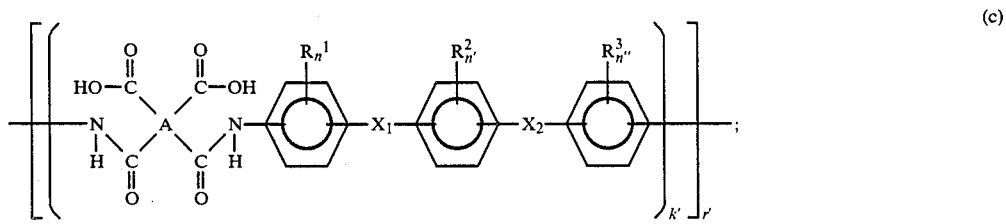
(c)

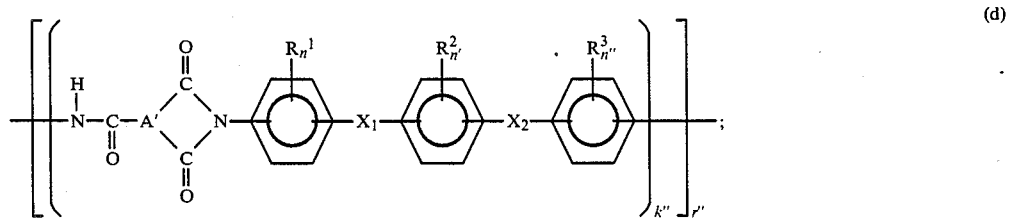
(d)

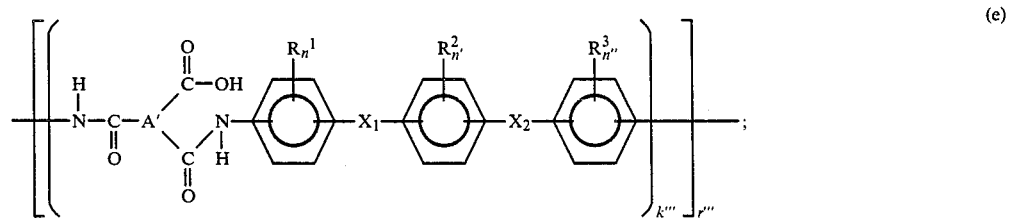
(e)

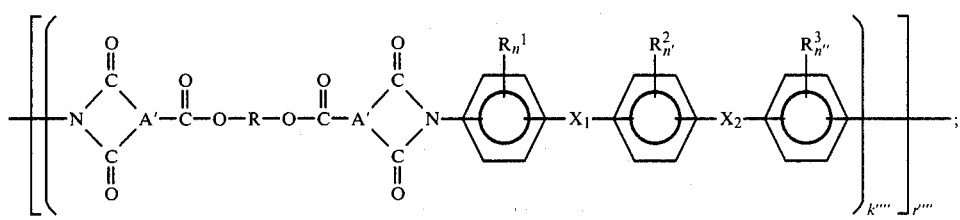  (f)

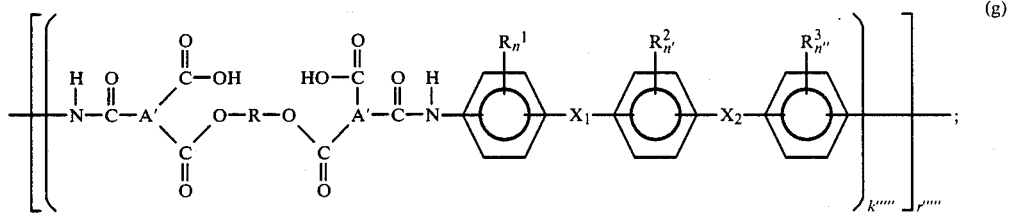  (g)

or mixtures thereof;
wherein

A, A′, R, R¹, R², R³, n, n′, n″, $X_1$ and $X_2$ are as hereinabove defined;

k, k′, k″, k‴, k″″ and k″‴ are positive integers of one or more and represent the number of different polymer blocks in said polymer; and r, r′, r″, r‴, R″″ and r″‴ are the same or different integers greater than 1; preferably they have values of from about 10 to about 10,000 or greater; r, r′, r″, r‴, r″″ and r″‴ represent the number of times the units are repeated in the polymer chain.

Polymers of this invention also include polymers composed of recurring structural units of formula (b), formula (c), formula (d), formula (e) formula (f), formula (g) or mixtures thereof with up to about 90 mole percent intercondensed recurring structural units of the formulae

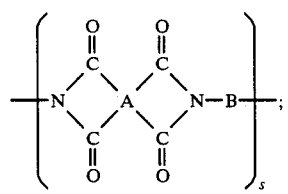  (h)

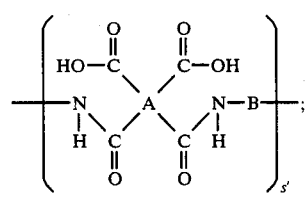  (i)

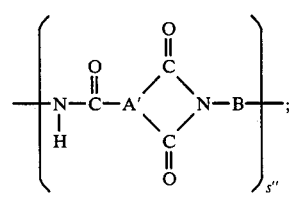  (j)

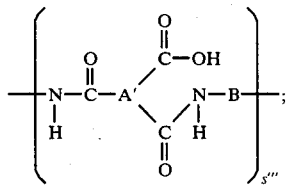  (k)

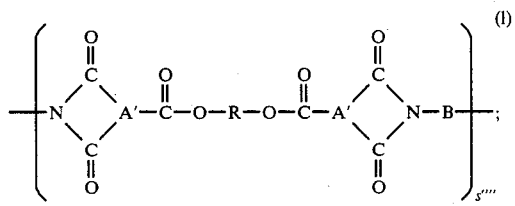  (l)

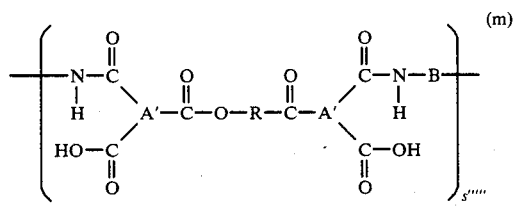  (m)

wherein

A, A′ and R are as hereinabove defined;

s, s′, s″, s‴, s″″ and s″‴ are the same or different integers greater than 1 and represent the number of times the units are repeated in the polymer chain; preferably they have values from 10 to 10,000 or greater;

B is a divalent radical derived from a diamine (hereinafter referred to as "other diamine") having the general formula $H_2N-B-NH_2$ where B can be aliphatic or cycloaliphatic, including alkylene or alkeylene, of from 2 to about 20 carbon atoms, cycloalkylene -f 4 to 8 carbon atoms, heterocycloalkylene of 4 to about 20 carbon atoms including hetero atoms such as —N—, —S— and —O—; polyoxyalkylene of from 4 to about 500 carbon atoms or, preferably, a carbocyclic aromatic of 6 to about 40 carbon atoms.

Thus part or all of the diamine reactants which can be used to prepare the polymers of this invention can comprise one or more of diaminels of formula (a) as described above, or the diamine(s) of formula (a) may be present in an amount of as little as about 10 mole percent and up to about 90 mole percent of the total diamine requirements may be satisfied by one or more of the other diamines having the general formula H$_2$N—B—NH$_2$ as described hereinabove.

Suitably, the other diamine(s) are aromatic in nature such that B can be substituted or unsubstituted phenylene, biphenylene, naphthylene, anthracenylene, etc. or a group of the formula

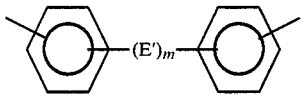

wherein m is 0 or 1, and E' is substituted or unsubstituted, branched or linear alkylene of 1 to 30 carbons,

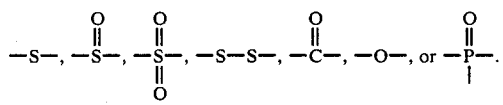

Any of the aryl nuclei can be substituted by lower alkyl, lower alkoxy or other noninterfering substituent groups and alkylene groups can be substituted by halogen.

Among the other diamines that are useful are:
m-phenylenediamine,
p-phenylenediamine,
2,2-(4,4'-diaminodiphenyl)propane,
4,4'-diaminodiphenylmethane (hereinafter referred to as "methylenedianiline"),
benzidine,
4,4'-diaminodiphenyl sulfide,
4,4'-diaminodiphenyl sulfone,
4,4'-diaminodiphenyl ether,
1,5-diaminonaphthalene,
3,3'-dimethylbenzidine,
3,3'-dimethoxybenzidine,
bis(p-β-methyl-α-aminopentyl)benzene,
1,3-diamino-4-isopropylbenzene,
1,2-bis(3-aminopropoxy)ethane,
m-xylylenediamine,
p-xylylenediamine,
bis(4-aminocyclohexyl)methane,
decamethylenediamine,
3-methylheptamethylenediamine,
4'-dimethylheptamethylenediamine,
2,11-dodecanediamine,
2,2-dimethylpropylenediamine,
octamethylenediamine,
3-methoxyhexamethylenediamine,
2,5-dimethylhexamethylenediamine,
2,5-dimethylheptamethylenediamine,
3-methylheptamethylenediamine,
5-methylnonamethylenediamine,
1,4-cyclohexanediamine,
1,12-octadecanediamine,
bis(3-aminopropyl)sulfide,
N-methyl-bis-(3-aminopropyl)amine,
hexamethylenediamine,
heptamethylenediamine,
nonamethylenediamine, and mixtures thereof.

B can also be the divalent residue of formula

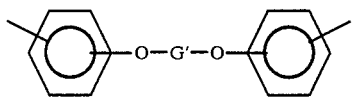

wherein G' is a substituted or unsubstituted phenylene or group of the formula

Suitably such other diamine is an aromatic diether diamine such as:
4,4'-bis-(p-aminophenoxy)diphenyl sulfide,
4,4'-bis(3''-aminophenoxy)diphenyl sulfide,
4,4'(3''-aminophenoxy,4'-aminophenoxy)-diphenyl sulfide,
4,4'-bis-(p-aminophenoxy)diphenyl sulfone,
4,4'-bis-(3''-aminophenoxy)diphenyl sulfone,
2,2-bis-[4'-p-aminophenoxy)phenyl]propane,
2,2-bis-[3'p-aminophenoxy)phenyl)propane,
1,1-bis-[4'(p-aminophenoxy)phenyl)ethylbenzene.

The residuum B can also be a heterocyclic aromatic of 6 to 20 carbon atoms while the hetero atoms are one or more of —N—, —O— and —S—, such as pyridine, pyrimidine, pyrazine, oxadiazine, oxathiazine, triazine, benzofuran, thionaphthene, indole, quinoline, benzoxazole, benzothiophene, carbazole, and the like.

B can also be the residue of a bis(amino)polysiloxane as disclosed and illustrated by U.S. Pat. No. 4,385,527 of the formula

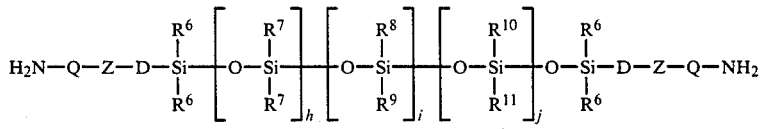

wherein
Q is a substituted or unsubstituted aromatic group $$-O-, -S-, -\overset{O}{\underset{O}{S}}-, -\overset{O}{\underset{O}{S}}-NH-, -HN\overset{O}{C}-, -\overset{O}{C}-O-;$$

D is unsubstituted or substituted hydrocarbylene; R$^6$, R$^7$, R$^8$, R$^9$, R$^{10}$ and R$^{11}$ each independently is substituted or unsubstituted hydrocarbyl;
h, i and j each independently has a value of 0 to 100.

B can also be the residue of a di(aminoalkyl)polysiloxane of the general formula

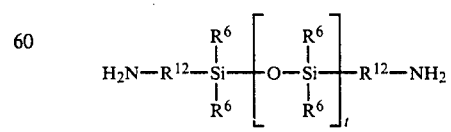

where
R$^6$ is as hereinabove defined;
R$^{12}$ is a divalent hydrocarbon; and
t is 1 or greater.

It is apparent that in accordance with the practice of the invention there are a number of variables available to the chemist in formulating useful polyimides, polyamide acids, poly(amide-imides), poly(amide-amide acids), poly(esterimides) and poly(esteramide acids) of the invention.

It has been found that the aromatic diamine of formula (a) can be used to prepare polymers which display properties that are totally surprising and unexpected. Polymers such as polyimides, poly(amide-imides) and poly(esterimides) prepared therefrom are melt processible and soluble in a variety of solvents including, for example, chlorinated hydrocarbon solvents, dipolar aprotic solvents, alkyl capped glymes and the like. Such polymers also display excellent thermal stability as well as adhesion characteristics which are as good as or superior to those found with other known polyimides and poly(amide-imides). Thus, polyimides, poly(amide-imides) and poly(esterimides) containing the diamine residues herein described can be processed quite readily using conventional melt processing fabrication techniques into molded products that display high thermal stability or can be used for coating and adhesion applications where tenacious adhesion and thermal stability would be important.

The melt processible polymers of this invention are capable of being readily formed and shaped by conventional techniques such as molding, extrusion, calendering, etc. Products fabricated from these polymers exhibit good thermal resistance as well as resistance to degradation caused by various environmental conditions. Solutions of these polymers in solvents such as those described above can be used to coat a variety of substrates including electrical and electronic components; such solutions can also be used to cast films or spin fibers. These polymer compositions also exhibit excellent adhesion to a variety of substrates including those prepared from polyimide, poly(amide-imide) and poly(esterimide) resins and thus can be used as primary or secondary adhesives or coatings for or between a number of different metallic and non-metallic materials.

Surprisingly, it has been found that a polyimide, poly(amide-imide) or poly(esterimide) derived from the aromatic diamine of formula (a) and a wide range of dianhydrides or acid anhydrides is soluble and thermoplastic or melt processible even when a substantial portion of the aromatic diamine is replaced by one or more other diamines. Polyimides, poly(amide-imides) and poly(esterimides) of the invention which are melt processible and soluble in chlorinated hydrocarbon, dipolar aprotic and the like solvents can be prepared with up to about 90 mole percent of the diamine content being diamine other than that having formula (a).

Thus, the properties of the polymers of the invention can be varied over a very broad range, depending on the particular combination of reactants that are chosen. In addition to adjusting the reactants, one can also modify the properties of polymers of the invention by blending different polymers. Different polyimides, poly(amide-imides) and/or poly(esterimides) can be mixed and blended to provide desired properties.

The reaction between the dianhydride component and aromatic diamine component to prepare the polyamide acid and polyimide compositions of this invention may be effected in a suitable solvent and optionally in the presence of a condensation catalyst. The solvent should dissolve the reactants as well as the product.

Suitable solvents include, for example, a dipolar aprotic liquid such as N,N-dimethylformamide (DMF), dimethylacetamide, N-methyl-2-pyrrolidone, hexamethylphosphortriamide, dimethyl sulfoxide (DMSO), tetramethyurea and the like chlorinated solvents such as chlorobenzene, dichlorobenzene, trichlorobenzene and the like: glyme solvents such as ethylene glycol dimethyl ether, diethylene glycol dimethyl ether and the like and mixtures thereof.

Where combinations of reactants will be employed, e.g. combinations of anhydrides and/or amines, attention should be paid to the reactivity of the components. In synthesizing the polymers of the invention, the total anhydride component and total amine are generally employed in equimolar amounts. While some excess of one of the is not detrimental to the condensation reaction, a considerable excess may result in the production of lower molecular weight products or undesirable by-products.

Since all or part of the diamine component employed to produce the polyimide, poly(esterimide) and polyamide acids of the invention can be the aromatic diamine compounds of formula (a), the polymer will contain from about 10 mole percent of the residue of said aromatic diamine component in addition to one or more other diamines to 100 mole percent of said aromatic diamine component with no other diamine components. Thus, there can be used from about 10 mole percent to 100 mole percent of the aromatic diamine component or mixtures thereof; however, the majority of applications will call for polymers containing from about 15 mole percent to 85 mole percent of the aromatic amine component and from about 15 to 85 mole percent of other diamine components.

Where the polyimide will contain 100 mole percent of the aromatic diamine of formula (a), the following sequence of reaction steps has been found to be effective:

(a) a reaction mixture of the selected dianhydride and the aromatic diamine is prepared and stirred in a suitable solvent.

(b) the reaction between the two reactants produces water in a refluxing reaction.

(c) the water produced by the refluxing reaction is removed by distillation.

(d) upon complete removal of the water, the resulting reaction product solution is cooled and polymer recovered by a suitable process such as, for example, by filtering and mixing the product solution with an excess of methanol to precipitate the reaction product;

(e) the precipitated polymer is separated by filtration, washed several times in fresh methanol and dried, preferably at an elevated temperature of about 60° C. to 80° C., preferably under vacuum to effect volatilization of the methanol and any adhering solvent.

Where the polyimide will contain a diamine component or components in addition to the aromatic diamine of formula (a), the polyimide may be prepared with a random molecular configuration, a block-block molecular configuration, a random-block-random molecular structure, a block-random molecular structure depending on the properties desired and the reactivity of the relative combination of reactants. Thus, the dianhydride component can be first reacted with the aromatic diamine component in a suitable solvent. The components may be either a single aromatic diamine or dianhydride or mixtures thereof. After completion of the reaction and removal of water that may be produced, the third component and/or fourth component, either another diamine, a different dianhydride or mixtures thereof is added to the reaction product mixture and the mixture is heated to an elevated temperature for a sufficient time to produce a polymeric solution of the polyimide which polymer may be recovered as described above or by other suitable method known in the art.

Where the desired product is a polyamide acid, the diamine component or combinations of such components are cooled to 0° C. The dianhydride component or components is thereafter added gradually, over an extended period of time with the temperature being maintained from about 0° C. to about 100° C., and preferably from about 20° C. to about 40° C. The polyamide acid forms readily without the application of heat and without catalysts. The polyamide acid thus formed can be readily converted to the polyimide by subjecting the polymer to cyclization. The cyclization can be effected using any of the methods known in the art for converting isolated polyamide acids or solutions thereof of polyimides. For example, cyclization of the polyamide acid can be effected by heating the polyamide acid at a temperature of from about 150° C. to about 250° C.

Alternatively, the polyimides of the invention can also be prepared by hot melt polymerization, in the absence of solvents. The materials are simply combined in generally equimolar amounts, mixed and heated. One such method involves combining the materials in an extruder heated to about 300° C. and extruding, on a continuous basis, the polyimide product.

It may also be desirable to add a chain stopper to the reacion mixture to control the molecular weight of the polymer produced. For example, phthalic anhydride or aniline may be used, preferably in an amount from about 1 percent to 5 percent by weight.

As in the case of the polyimides, the reaction between the aromatic diamine component of formula (a) and the acid anhydride component to prepare poly(amide-imide) and poly(amide-amide acids) may be effected in a suitable solvent and proceeds stepwise. The formation of the amide-amide acid generally takes place by simply combining and mixing the diamine component with the triacid anhydride component. The amide- imide can then be formed by cyclization which is effected by heating at temperatures on the order of about 150° C. to about 250° C.

Alternatively, the poly(amide-imides) of the invention can also be prepared by hot melt polymerization, in the absence of solvents when the materials are simply combined in generally equimolar amounts, mixed and heated.

Polyimides, poly(esterimides and poly(amide-imines) of the invention have a variety of uses. They are melt processible and can be employed in the fabrication, by molding, of a variety of articles which possess structural strength and resistance to deformation or degradation at high temperatures. Because of their solubility, excellent high temperature characteristics and electrical qualities they are particularly suitable for use in a number of electrical and electronic applications.

The polymers of the invention are suitable for use in electronic applications such as wire enamels, as conformal, protective, junction and passivation coatings for electrical devices, printed circuit boards and semiconductor devices. The polymers can be easily applied and cured in place. They will not degrade in use, and will generally enhance the electrical characteristics of the device to which they are applied. They adhere very tenaciously to the surface to which they are applied and prevent migration of ions on the surface of the device. When employed with semiconductor devices, they do not release any materials during drying cycles which are deleterious to the operating characteristics of the device.

The polymers are also capable of being applied in multiple layers to provide a thick coating when required and are able to bond well to itself as well as to many metallic and non-metallic substrates.

The polyimides, poly(esterimides) and poly(amideimides) are translucent. Such materials, while retaining the other desirable characteristics, are useful to fabricate photovoltaic devices. They are desirable for bonding a light emitting diode to the surface of another semiconductor device to turn the device "on" and "off" in response to the operation of the light emitting diode. Copolymer materials of this invention are also applicable for use in bonding protective covers to exposed surfaces of photovoltaic devices such as solar cells.

The dielectric strength of the polyimide, poly(esterimide) or poly(amide-imide) may be further enhanced by admixing suitable filler materials therein. Preferably, an electrically insulating material having a dielectric constant which is approximately the same as the polymer is admixed therein. The filler material is uniformly distributed throughout the coating as applied to a substrate. Other material suitable as a filler material are those materials known to have a relatively good ability to resist electrical conduction although their dielectric constant is higher than that of the polymer. Suitable electrically insulating filler materials have been found to include aluminum oxide, silicon oxide, glass fibers, boron nitride, quartz, mica, magnesium oxide, activated polytetrafluorethylene and the like in a finely divided, or pulverized form. Whether a filled or unfilled polyimide, poly(esterimide) or poly(amide-imide) is employed, the electrical properties of a given device are generally enhanced.

The polyimide, poly(esterimide) or poly(amide-imide) has an inherent elasticity to withstand repeated cycling from dipping into liquid gases at a temperature of approximately $-100°$ C. and back into a liquid gas for a temperature excursion range of about 200° C. or more. Additionally, it has been found that the polyimides withstand short temperature excursion up to about 350° C. to 550° C. without degradation of their electrical characteristics.

The polyimide, poly(esterimide) or poly(amide-imide) can be applied over electrically insulating layers of silicon oxide, silicon nitride, aluminum nitride and the like; it can also be applied as an insulating layer in place of those materials.

A thermoplastic polyimide, which is substantially inert, temperature resistant, capable of flowing upon heating, and having superior dielectric properties, finds application for example, as a passivation coating. Following application of the polyimide to the device, holes can be made in the polyimide, wires attached to the device and the device heated; the polyimide will flow to fill the voids around the wires, thus providing a self-levelling passivation coating.

Because of their adhesive and dielectric properties, the polyimides, poly(esterimides) or poly(amide-imides) can be used to combine two or more layers of chips to provide multilayer semiconductor devices.

The thermoplastic polyimides, poly(esterimides) and poly(amide-imides) of the invention are processible by extrusion, compression and injection molding, film casting and solution fiber spinning techniques. Because of their high elongation and toughness, they are particularly useful in thin-film products such as films, enamels, adhesives, coatings and fibers. Polyimides, moreover, can be molded into parts that retain high strength at 200° C. and as high as 250° C. for short periods, such as, for example, during processing of graphite and glass-fiber laminates. The polymers can be extruded into tubing and the like or onto substrates such as conductive wire and can be co-extruded with other polymers to prepare multilayer tubing or insulated wire which display good adhesion between layers to provide improved high temperature and electrical properties. Laminates, films and coatings display a minimum of voids or imperfections because no reaction products are formed at processing temperatures.

The thermoplastic polyimides, poly(esterimides) and poly(amide-imides) of this invention have the following general properties: they are molded simply by exceeding the glass transition temperature for sufficient time with application of pressure for good flow; their elongation imparts good machineability with low brittleness; the polyimides, poly(esterimides) and poly(amide-imides) require no postcure to develop full high-temperature properties; they can be reclaimed and used as required: they can be cast into film from solution using conventional casting machines, the films being useful in both supported and unsupported applications; the films adhere well by heat-sealing to themselves as well as to other polyimides, poly(esterimides) or poly(amide-imides); they can be solution-spun into fibers to produce flame resistant, high temperature resistant fabrics; they can be molded with various fillers into parts having high strength at high service temperatures and flame resistance; unfilled molded parts have low coefficients of thermal expansion while glass, graphite and asbestos-filled parts give still lower coefficients of thermal expansion; they provide parts that wear well with low friction and molding compounds filled with graphite powder, molybdenum or tungsten disulfide or PTFE produce parts with self-lubricating wear surfaces such as piston rings, valve seats, bearings, seals and thrust washers.

Laminates are made in high-pressure platen presses, low-pressure vacuum bags or moderate pressure vacuum autoclave bags. Solutions can be used as laminating varnish to impregnate glass, graphite, quartz or the like cloth, or glass, boron, graphite, ARAMID or the like fibers to produce laminates with flame-resistance, high-temperature strength and good electrical properties which have utility in radomes, printed circuit boards, radioactive waste containers, as well as for turbine blades and structural parts which are used close to the hot engine environment.

Polyimide film has good mechanical properties through a range from liquid helium temperature to 450° C. It has high tensile and impact strength and high resistance to tear initiation. Room temperature properties are comparable to hose of polyester film while at 200° C., the film can be bent around a ¼-inch mandrel without breaking and at 250° C. it has a tensile strength on the order of 3500–4000psi.

The foregoing specification has described a variety of molecular configurations and applications of a polyimide, a poly(esterimide) and a polyamide acid. The invention is further illustrated in the following examples. All parts and percentages are by weight unless otherwise indicated.

EXAMPLE 1

Into a 250 ml, 3-neck flask fitted with a stirrer, a condenser, a Dean Stark trap, a thermometer, a thermowatch, a heating mantle and a nitrogen blanket, 3.44 grams (0.01 mole) of 1,4-bis(p-aminocumyl)benzene were charged under a nitrogen atmosphere along with 50 grams of N-methyl pyrrolidone (NMP). The mixture was agitated until a clear solution was obtained. Then 5.10 grams (0.01 mole) of 4,4'-bis(3,4-dicarboxyphenoxy)diphenyl sulfide dianhydride were charged into the flask along with 77.10 grams of N-methyl pyrrolidone under a nitrogen atmosphere. 0.01 grams of p-toluene sulfonic acid (catalyst) were also charged in the flask. The reaction mixture was agitated until a clear solution was obtained and heat was applied until the reflux temperature was achieved. The reaction mixture was then maintained at reflux temperature for one hour. During this time about 50 grams of NMP was distilled off along with the water formed during the condensation reaction. The temperature of the reaction mass was then reduced to and controlled between 195° C. to 198° C. for about 4 hours. After completion of the reaction the heat was turned off and the reaction mass was allowed to cool to 50° C.

A clear polymer solution was obtained which was poured into methanol to precipitate the polymer. The polymer was washed with fresh methanol and then dried at ambient temperature for 48 hours.

The polyimide polymer was dissolved in N-methylpyrrolidone to obtain a 10% solids clear solution. A film was cast on a glass plate treated with a TEFLON release agent and dried in an oven over a temperature range of 0° C. to 300° C. A flexible, clear dark brown film was obtained. The glass transition temperature of the polyimide resin was determined to be 215° C. by Differential Scanning Colorimetry.

EXAMPLE 2

Using the apparatus and procedure of Example 1, 3.44 grams (0.01 mole) of 1,4-bis(p-aminocumyl)benzene were reacted with 3.2525 grams (0.01 mole) of 3,3',4,4'-benzophonetetracarboxylic dianhydride. A clear polymeric product was recovered from the reaction mixture.

A 10% by weight solution of the polyimide in NMP was prepared which was cast on a pretreated glass plate and then dried in an oven over a temperature range of 0° C. to 300° C. A flexible, clear dark brown film was obtained, which had a glass transition temperature of 257° C. as determined by Differential Scanning Colorimetry.

EXAMPLE 3

A 1000 ml 3-neck flask fitted with a stirrer, a condenser, a Dean Stark trap, a thermometer, a heating mantle and a nitrogen blanket was charged under a nitrogen atmosphere with 17.2 grams (0.05 mole) of 1,4-bis(p-amino-cumyl) benzene along with 300 grams of N-methylpyrrolidone. The mixture was agitated until a clear solution was obtained. Then 32.525 grams (0.1 mole) of 3,3',4,4 '-benzophenone tetracarboxylic dianhydride in 300 grams of NMP and 22.5 grams (0.05 mole) of 4,4' sulfonylbis(p-phenyleneoxy)dianiline in 150.925 grams of NMP and 0.1 grams of p-toluene sulfonic acid were charged to the reactor under a nitrogen atmosphere. The reaction mixture was agitated while heat was applied at a constant rate until the reflux temperature was achieved. The reaction mixture was held at the reflux temperature for 1 hour during which time 110 grams of NMP was distilled off along with the water that was formed during the condensation reaction. The reaction mixture was then held at a temperature of 195° C. to 198° C. for 4 hours after which the heating unit was turned off and the temperature was allowed to cool to 100° C.

The clear polymeric reaction mixture was filtered and then poured into methanol where the polyimide polymer precipitated. The polymer was then washed with methanol and air dried for 48 hours.

The polyimide was dissolved in NMP to obtain a 10% by weight solid, clear solution and a film was cast on a glass plate treated with a TEFLON release agent. The resin coated glass was dried in an oven for 45 minutes at 90° C., 20 minutes at 150° C., 20 minutes at 200° C. and then 15 minutes at 300° C. A flexible, clear dark brown film was obtained. The polyimide was determined to have a glass transition temperature of 270° C. by Differential Scanning Colorimetry.

EXAMPLE 4

Using the apparatus and procedure of Example 1, 1.72 grams (0.005 mole) of 1,4-bis(p-aminocumyl) benzene were reacted with 5.1 grams (0.01 mole) of bis[4,4'-di(3,4-dicarboxyphenoxy)phenyl]sulfide dianhydride and 2.25 grams (0.005 mole) of 4,4'-bis-(p-aminophenoxy)diphenylsulfone. A clear polymer solution was obtained which was poured into methanol to precipitate the polymer and the polymer was washed with fresh methanol and then dried at ambient temperature for 48 hours. A 10 percent by weight solution of the resultant polyimide polymer in NMP was prepared which was cast on a pretreated glass plate and then dried at a temperature range of 0° C. to 300° C. to obtain a flexible, thermoplastic, clear dark brown film which had a glass transition temperature of 213° C. obtained by Differential Scanning Colorimetry (D.S.C.).

EXAMPLES 5-10

Using the apparatus and procedure of Example 1, Examples 5-10 were carried out using the dianhydrides and diamines set forth in the Table below. The glass transition temperature of each such thermoplastic polymer which was obtained is also indicated in the Table.

TABLE

| Example | Dianhydride | Diamine | Diamine | Glass Transition Temperature by D.S.C. |
|---|---|---|---|---|
| 5 | bis-[4,4'-di(3,4-dicarboxyphenoxy)-phenyl]sulfone 5.47 g (0.01 mole) | 1,4-bis(p-amino-cumyl)benzene 1.72 g (0.005 mole) | 4,4'-sulfonyl-bis-(p-phenyleneoxy)-dianiline 2.25 g (0.005 mole) | 177° C. |
| 6 | 4,4'-bis(3,4-dicarboxyphenoxy)-biphenyl dianhydride 4.78 g (0.01 mole) | 1,4-bis(p-amino-cumyl)benzene 1.72 g (0.005 mole) | 4,4'-sulfonyl-bis-(p-phenyleneoxy-dianiline 2.25 g (0.005 mole) | 247° C. |
| 7 | 2,2'-bis[4,4'(3,4-dicarboxyphenoxy)-phenyl]propane dianhydride 5.2 g (0.01 mole) | 1,4-bis(p-amino-cumyl)benzene 1.72 g (0.005 mole) | 4,4'-sulfonyl-bis-(p-phenyleneoxy)-dianiline 2.25 g (0.005 mole) | 225° C. |
| 8 | bis-[4,4-di(3,4-dicarboxyphenoxy)-phenyl]sulfone 5.47 g (0.01 mole) | 1,4-bis(p-amino cumyl)benzene 3.44 g (0.01 mole) | — | 212° C. |
| 9 | 4,4'-bis(3,4-dicarboxyphenoxy-biphenyl dianhydride 4.78 g (0.01 mole) | 1,4-bis(p-amino-cumyl)benzene 3.44 g (0.01 mole) | — | 237° C. |
| 10 | 2,2'-bis[4,4'(3,4-dicarboxyphenoxy)-phenyl]propane dianhydride 5.2 g (0.01 mole) | 1,4-bis(p-amino-cumyl)benzene 3.44 g (0.01 mole) | — | 212° C. |

EXAMPLE 11

A 1000 ml, 4-neck flask, fitted with stirrer, condenser, Y-tube, powder addition funnel, thermometer, dry ice-acetone cooling bath and nitrogen blanket was charged under a nitrogen atmosphere with 17.2 grams (0.05 mole) of 1,4-bis(p-aminocumyl)benzene along with 105.5 grams with reagent grade dimethyl acetamide (DMAC). After agitation and cooling down to a temperature of about −10° C., 5.26 grams (0.025 mole) of trimellitic anhydride monoacid chloride was charged over a period of about 20 minutes' time while continuing agitation and maintaining a temperature below −5° C. under a nitrogen atmosphere. An additional 5.26 grams (0.025 mole) of trimellitic anhydride monoacid chloride was charged over about 40 minutes' time while continuing agitation at about −5° C. under nitrogen atmosphere. Then at a temperature in the range of 0° to 5° C. 5.5 grams (0.05 mole) of triethylamine was charged dropwise over about 20 minutes time under nitrogen atmosphere while continuing agitation. Subsequently 35.5 grams of reagent grade DMAC was charged under nitrogen and the reaction mass was agitated at about 15° C. for three hours. Thereafter 18.9 grams of pyridine and 27.1 grams of reagent grade acidic anhydride was charged under nitrogen atmosphere and the reaction mass was then allowed to agitate for 12 hours at room temperature. The reaction mass was then filtered to remove pyridine hydrochloride and the filtrate was then poured into water to precipitate the polyamide-imide polymer. This polymer was washed with copious amounts of fresh water and chopped to a fine powder in a mechanical blender and dried overnight. The dried polymer was subsequently cured in a vacuum oven at 60° C. and 300 mm Hg pressure for two hours and then packed in a glass Jar.

Ten grams of the polymer obtained above were dissolved in 30 grams of NMP to obtain a clear solution. A film was subsequently cast from this solution on a treated glass plate and cured in a force air oven using standard cure schedule. A clear yellow thermoplastic film was obtained which had a glass transition temperature of 183° C. as determined by Thermomechanical Colorimetry.

EXAMPLE 12

Example 11 was repeated, except that 13.76 grams (0.04 mole) of 1,4-bis(p-aminocumyl)benzene was reacted together with 8.422 grams (0.04 mole) of the trimellitic anhydride monoacid chloride along with 18.0 grams (0.04 mole) of 4,4'-sulfanile-bis(p-phenyleneoxy)-dianiline, and thereafter the remaining 8.42 grams (0.04 mole) of trimellitic anhydride monoacid chloride was added in the same manner as described in Example 11. 8.89 grams (0.08 mole) of triethylamine was utilized together with 30.22 grams of pyrridine and 43.34 grams of reagent grade acetic anhydride.

After working up the polymer in the same manner as described in Example 11, an off-white color thermoplastic polymeric film was obtained. This polymer exhibited excellent adhesion characteristics.

EXAMPLE 13

Using the apparatus and procedure of Example 1, 10.32 grams (0.03 mole) of 1,4-bis(p-aminocumyl)benzene were reacted with 19.2 grams (0.03 mole) of 2,2-bis(trimellitic oxyphenyl)propane dianhydride. A clear polymeric product was recovered from the reaction mixture.

A 10% by weight solution of the resultant poly(esterimide) polymer in NMP was prepared and then cast on a treated glass plate which was then dried in an oven at a temperature range of 0° C.-300° C. A flexible, clear, dark brown film was obtained which had a glass transition temperature of 200° C. by D.S.C.

EXAMPLE 14

Example 13 was repeated, except that the quantity of 1,4-bis(p-aminocumyl)benzene was cut in half and replaced by 6.75 grams (0.015 mole) of 4,4'-sulfonylbis(p-phenyleneoxy)-dianiline. Again, a clear polymeric product was obtained from the reaction mixture.

A 10% by weight solution of the resultant copolymer (esterimide) polymer in NMP was prepared and then cast on a treated glass plate and subsequently dried in an oven at a temperature range of 0° C. to 300° C. A flexible, clear, dark brown film was obtained which had a glass transition temperature of 205° C.

EXAMPLE 15

In a 500 ml 3-neck flask fitted with a high torque stirrer tap water cooling bath, thermometer and nitrogen blanket, 34.4 grams (0.1 mole) of 1,4-bis(p-aminocumyl)benzene were charged along with 103.2 grams of NMP under nitrogen atmosphere. Agitation was applied to obtain a clear solution and thereafter cooling was applied so as to maintain a temperature throughout the entire operation in the range of 20°-35° C. To the cooled solution, 32.59 grams of 3,3', 4,4'-benzophenone tetracarboxylic dianhydride were charged in predetermined portions along with 97.8 grams of NMP in predetermined portions so as to maintain 25% solids concentration at any given time, under a nitrogen atmosphere, while continuing agitation at a constant steady speed. The addition was completed in about 35 minutes' time and then the reaction mass was allowed to agitate at room temperature for 16 hours to achieve completion of the reaction. Thereafter, the resultant polyamic acid was pressure filtered under nitrogen atmosphere and stored in a polypropylene bottle at 0°-5° C.

A 20-gram portion of the polyamic acid was mixed with 10 grams of DMAC and this solution was then spread on a treated glass plate and subsequently subjected to a cure schedule in a forced air oven as follows:

75° C. for 45 minutes,
100° C. for 30 minutes,
150° C. for 1 hour,
200° C. for 1 hour, and
300° C. for 30 minutes.

A thermoplastic, flexible yellow-colored polyimide film was obtained which had a glass transition temperature of 275° C.

EXAMPLE 16

Example 15 was repeated, except half of the ,4-bis(p-aminocumyl)benzene was replaced with 22.5 grams of 4,4'-sulphenylbis (p-phenylenoxy)dianiline. After workup in the same manner, the resultant copolyimide polymer film exhibited a glass transition temperature of 273° C. by D.M.C.

What is claimed is:

1. A thermoplastic polyimide, poly(amide-imide), poly(esterimide) polyamide acid, poly(amide-amide acid) or poly(esteramide acid) composition which contains at least about 10 mole percent of the reaction product of an aromatic or aliphatic tetracarboxylic dianhydride or acid tricarboxylic acid anhydride and an aromatic diamine having the formula

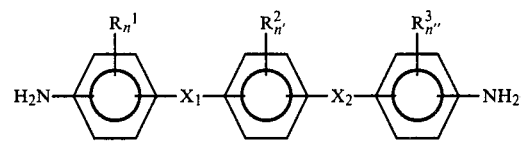

wherein
R$^1$, R$^2$ and R$^3$ each independently is hydrogen, halogen or unsubstituted or substituted hydrocarbyl,
X$_1$ and X$_2$ each independently is substituted or unsubstituted branched, linear or cyclic alkylene or alkenylene of 1 to about 30 carbon atoms, —S—, or —O— with the proviso that X$_1$ and X$_2$ are not both concurrently —S— or —O—.
n, n' and n'' each independently is an integer of 1 to 4.

2. The composition of claim 1 which contains at least about 10 mole percent of a residue of the formula

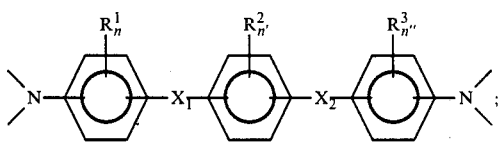

-continued

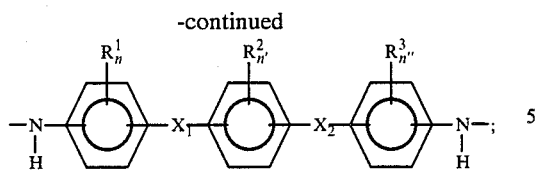

or mixtures thereof, and
at least about 10 mole percent of a residue having the formula

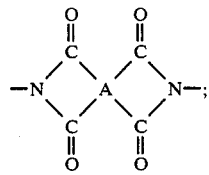

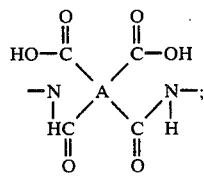

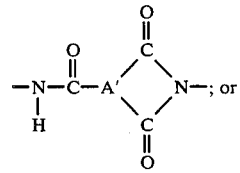

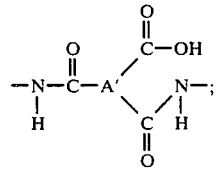

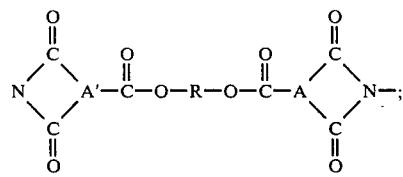

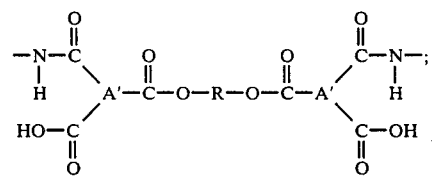

or mixtures thereof,
wherein A is a tetravalent radical derived from a substituted or unsubstituted aromatic or aliphatic dianhydride and A' is a trivalent radical derived from a substituted or unsubstituted atomatic or aliphatic acid anhydride, and R is an alkylene or arylene radical.

3. The composition of claim 2 wherein the composition has recurring structural units of the general formulae:

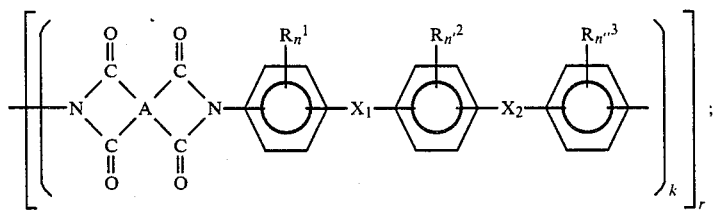

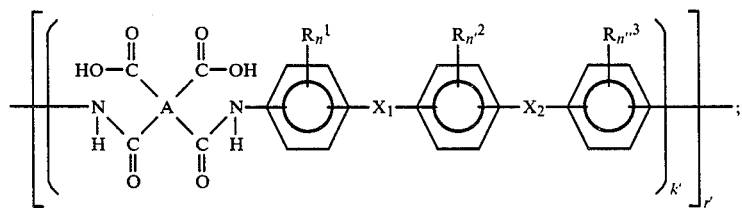

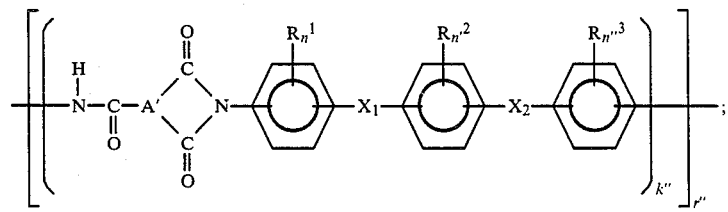

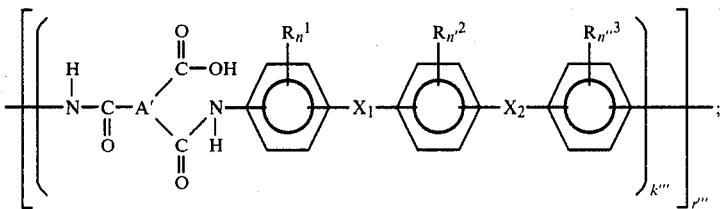

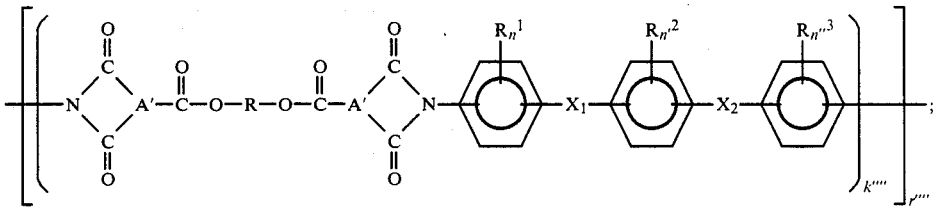

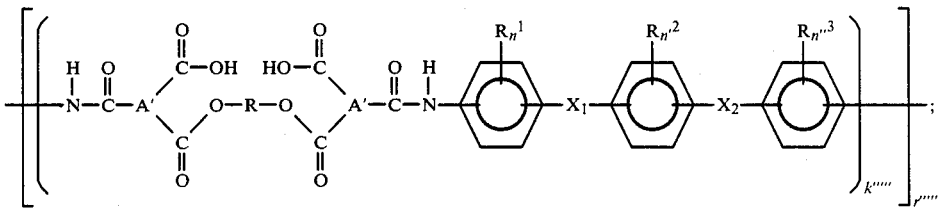

or mixtures thereof,
wherein
k, k', k'', k''', k'''' and k''''' are positive integers of one or more and represent the number of different polymer blocks in said polymer; and r, r', r'', r''', r'''' and r''''' are the same or different integers greater than 1 and represent the number of times the units are repeated in the polymer chain.

4. The composition of claim 3 comprising a polyimide having recurring structural units of the general formula

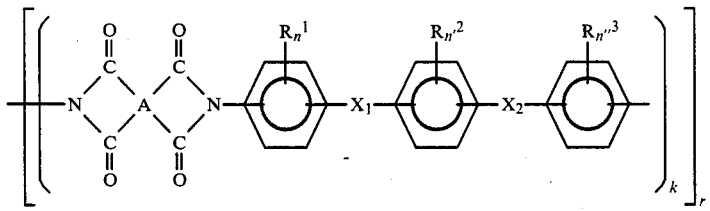

5. The composition of claim 4 which contains up to about 90 mole percent intercondensed structural units of the formula

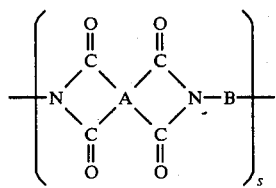

wherein
B is a divalent radical derived from a diamine having the general formula $H_2N-B-NH_2$, wherein B is an aliphatic or cycloaliphatic group of 2 to about 20 carbon atoms, heterocyclic group of 6 to about 20 carbon atoms, polyoxyalkylene group of from 4 to about 500 carbon atoms, aromatic group of 6 to about 40 carbon atoms, or is derived from a bis-(aminofunctional) polysiloxane or combinations thereof; and s is an integer greater than 1.

6. The composition of claim 3 wherein A is a tetravalent benzene or naphthalene nucleus or a substituted tetravalent group of formula

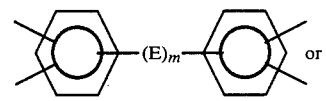 or

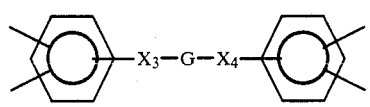

wherein
m is 0 or 1;
E is

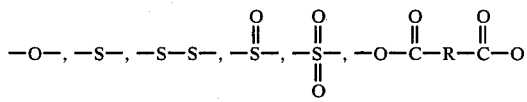

where R is substituted or unsubstituted linear or branched alkylene or arylene of 1 to 30 carbon atoms,

or substituted or unsubstituted linear, branched, or-cyclic, alkylene of 1 to about 30 carbon atoms, or alkenylene of 2 to about 30 carbon atoms;

G is phenylene or a substituted or unsubstituted group of formula

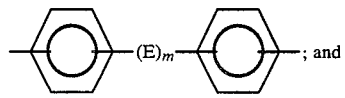 ; and $X_3$ and $X_4$ each independently is

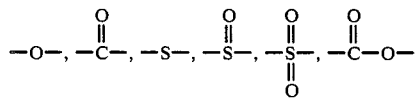

substituted linear or branched, alkylene of 1 to about 30 carbon atoms or alkenylene of 2 to about 30 carbon atoms.

7. The composition according to claim 5 where in B is substituted or unsubstituted phenylene, diphenylene, naphthylene or a group of the formula

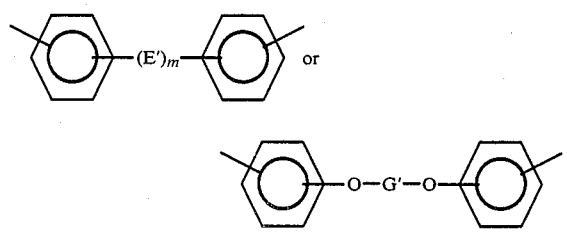

wherein
m is 0 or 1;
E' is

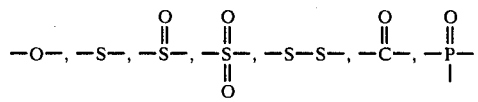

or substituted or unsubstitiuted branched or linear alkylene of 1 to about 30 carbon atoms; and
G' is substituted or unsubstituted phenylene or a group of the formula $-(E'')_m-$.

8. The composition of claim 5 wherein the bis(aminofunctional)polysiloxane has the formula

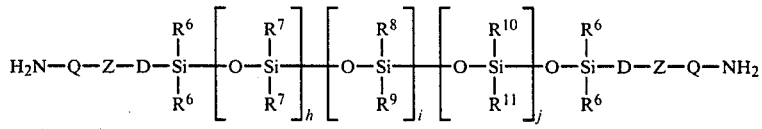

wherein
Q is a substituted or unsubstituted aromatic group;
Z is $-O-,-S-,-S-,-\overset{O}{\underset{O}{S}}-,-\overset{O}{\underset{O}{S}}-NH,-HN-\overset{O}{C},-\overset{O}{C}-O-;$ D is substituted or unsubstituted hydrocarbylene;
$R^6$, $R^7$, $R^8$, $R^9$, $R^{1-}$ and $R^{ll}$ each independently is substituted or unsubstituted hydrocarbyl; and
h, i and j each independently has a value of 0 to 100.

9. The composition of claim 1 wherein said composition contains between about 15 to 85 mole percent of said reaction product.

10. The composition of claim 1 wherein $X_l$ and $X_2$ each is a divalent group of the formula

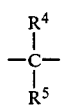

wherein
and $R^4$ and $R^5$ each independently is hydrogen, substituted or unsubstituted alkyl having up to asbout 12 carbon atoms, substituted or unsubstituted alkenyl having 2 to about 12 carbon atoms, substituted or unsubstituted cycloalkyl of 4 to about 12 carbon atoms, substituted or unsubstituted carbocyclic aromatic or heterocyclic aromatic having 5 to about 24 carbon atoms, or mixtures thereof, with the proviso that $X_1$ and $X_2$ do not both concurrently have both $R^4$ and $R^5$ as hydrogen.

11. The composition of claim 10 in which $R^4$ and $R^5$ each independently is substituted or unsubstituted alkyl of 1 to 8 carbon atoms, substituted or unsubstituted alkenyl of 2 to 8 carbon atoms, substituted or unsubstituted cycloalkyl of 4 to 8 carbon atoms or mixtures thereof.

* * * * *